(12) United States Patent
Townson et al.

(10) Patent No.: US 8,911,005 B2
(45) Date of Patent: Dec. 16, 2014

(54) VEHICLE HEADLAMP ASSEMBLY AND METHOD OF INSTALLING A VEHICLE HEADLAMP ASSEMBLY

(71) Applicant: GM Global Technology Operations LLC, Detroit, MI (US)

(72) Inventors: James M. Townson, Clarkston, MI (US); Richard J. Pyszel, Macomb, MI (US); Jeffrey K. Ulrich, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 184 days.

(21) Appl. No.: 13/734,544

(22) Filed: Jan. 4, 2013

(65) Prior Publication Data

US 2014/0192549 A1 Jul. 10, 2014

(51) Int. Cl.
*B60N 99/00* (2006.01)
*B60Q 1/04* (2006.01)
*B62D 65/02* (2006.01)
*B62D 65/16* (2006.01)
*B62D 25/08* (2006.01)

(52) U.S. Cl.
CPC .............. *B60Q 1/045* (2013.01); *B62D 65/024* (2013.01); *B62D 65/16* (2013.01); *B62D 25/085* (2013.01)
USPC .......................... 296/193.09; 362/548; 29/466

(58) Field of Classification Search
USPC ................. 296/193.09, 198; 362/548; 29/466
See application file for complete search history.

(56) References Cited

U.S. PATENT DOCUMENTS

| | | | |
|---|---|---|---|
| 7,252,421 B2* | 8/2007 | Dawson et al. | 362/519 |
| 2011/0211361 A1* | 9/2011 | Kawamura | 362/516 |
| 2013/0026791 A1* | 1/2013 | Huber et al. | 296/193.09 |
| 2013/0070471 A1* | 3/2013 | Pickholz | 362/520 |
| 2013/0141929 A1* | 6/2013 | Moisy et al. | 362/516 |

* cited by examiner

*Primary Examiner* — Lori L Lyjak
(74) *Attorney, Agent, or Firm* — Cantor Colburn LLP

(57) ABSTRACT

A vehicle headlamp assembly includes a first guiding component. Also included is a headlamp housing having a second guiding component for engaging the first guiding component in a sliding relationship for directing of the headlamp housing toward a loaded position. Further included is at least one locating pin integrally formed with and extending from the headlamp housing, the at least one locating pin configured to extend through an aperture of an adjacent vehicle component for providing stable positioning of the headlamp housing during installation of the vehicle headlamp assembly.

16 Claims, 10 Drawing Sheets

VEHICLE HEADLAMP ASSEMBLY AND METHOD OF INSTALLING A VEHICLE HEADLAMP ASSEMBLY

FIELD OF THE INVENTION

The subject invention relates to vehicles, and more particularly to a vehicle headlamp assembly, as well as a method of installing the vehicle headlamp assembly.

BACKGROUND

Vehicles, such as automobiles, are assembled by aligning and fastening numerous components and sub-assemblies to one another. One region of the automobile requiring assembly of such components and sub-assemblies is a front end region, sometimes referred to as a "front clip." The front clip is commonly defined as the region of the vehicle extending from the A-pillar to the most forwardly disposed component, typically a front bumper. The front clip includes a structural frame, as well as a variety of components that collectively form a body.

A sub-assembly of the front end region includes a headlamp assembly that provides a structure for housing illuminating components, as well as electrical connections therein. Several efforts to directly or indirectly mount and/or fix the headlamp assembly to the front end region have included several approaches which rely on machined body mounting locations for the body components. Approaches relying on such body mounting locations have undesirably led to large variations in alignment and fastening of components to each other. Numerous issues related to large variations may influence the aesthetic appearance of the automobile and may result in complicated procedures for an installation operator responsible for aligning and mounting the headlamp assembly. The complicated procedures lead to inefficiency, human error and assembly plant damage due to unintentional and undesirable contact of the headlamp assembly with surrounding front end components.

SUMMARY OF THE INVENTION

In one exemplary embodiment of the invention, a vehicle headlamp assembly includes a first guiding component. Also included is a headlamp housing having a second guiding component for engaging the first guiding component in a sliding relationship for directing of the headlamp housing toward a loaded position. Further included is at least one locating pin integrally formed with and extending from the headlamp housing, the at least one locating pin configured to extend through an aperture of an adjacent vehicle component for providing stable positioning of the headlamp housing during installation of the vehicle headlamp assembly.

In another exemplary embodiment of the invention, a method of installing a vehicle headlamp assembly is provided. The method includes disposing a headlamp housing in close proximity with a positioning and reinforcement structure and a fender assembly. Also included is aligning a first guiding component of at least one of the positioning and reinforcement structure and the fender assembly with a second guiding component of the headlamp housing. Further included is sliding the second guiding component along the first guiding component toward a loaded position. Yet further included is extending a locating pin extending from the headlamp housing through an aperture of an adjacent vehicle component for securing the headlamp housing in a non-rotatable position.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
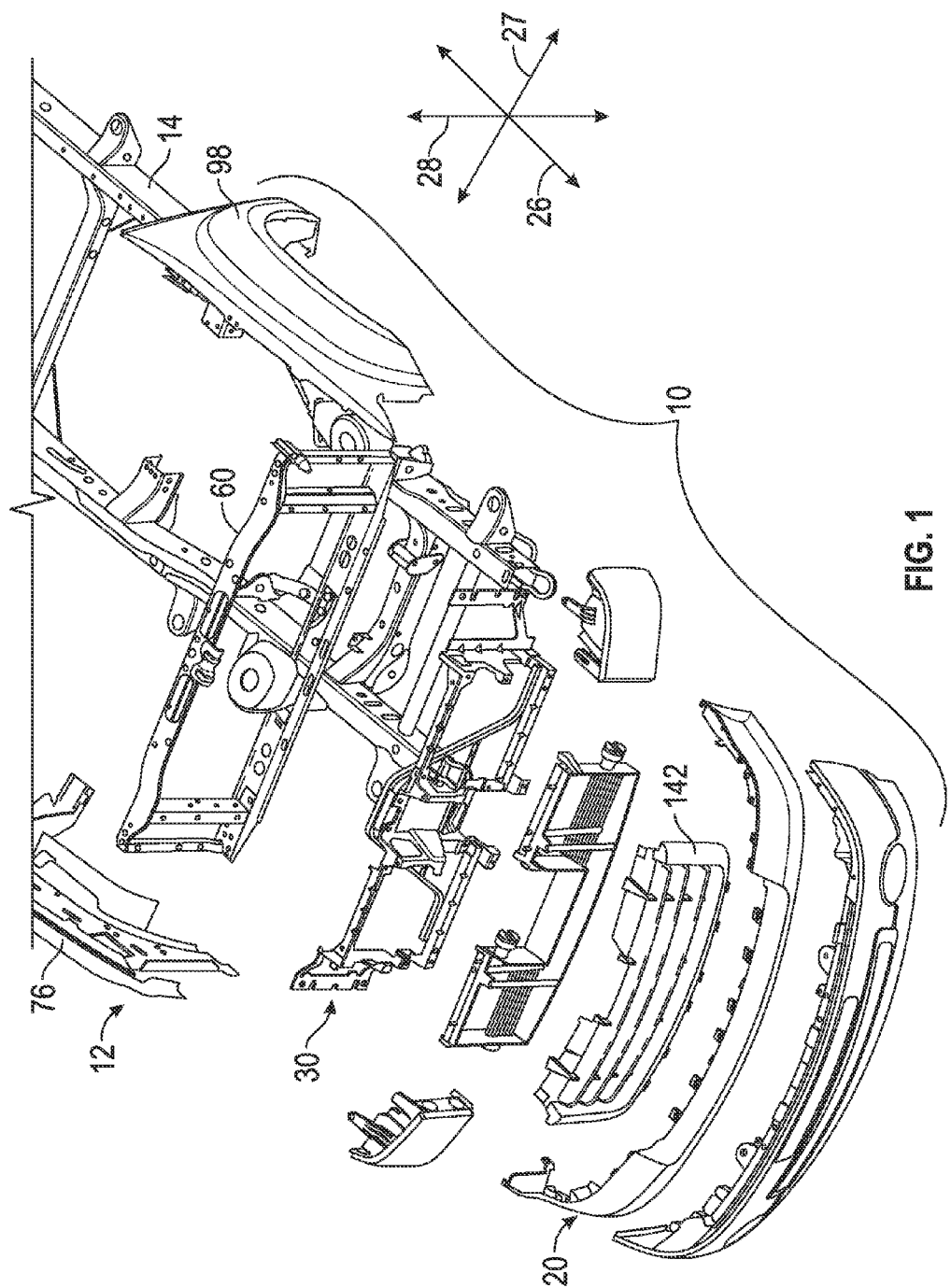
FIG. 1 is a simplified, partially disassembled view of a front end assembly of a vehicle.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending from what is commonly referred to as an "A-pillar" 18 (best illustrated in FIG. 4) to a forwardly disposed component, such as a bumper 20 for the vehicle 12. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. Additionally, the positioning and reinforcement structure 30 provides structural support for directly and indirectly attached components. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as positioning and reinforcement assembly 30 or GOR assembly. As will be described in detail below, the positioning and reinforcement structure 30 includes locators, fastening features, and other critical dimensional relationship interfaces of several components and sub-assemblies. Such components and sub-assemblies typically include fender assemblies, headlamps, grills, fascias, bumpers and bumper attachment features, hoods, hood latches, hood bumpers and under-hood closeout panels, air baffles and radiator supports, for example. It is to be understood that the preceding list is merely illustrative of the numerous components and sub-assemblies which may be included in the front end assembly 10 and may benefit from the positioning and reinforcement structure 30. Exemplary components and sub-assemblies will be described in detail below. As used herein, an axial direction, or a fore-aft direction 26 refers to a direction that extends frontward and rearward along an axis of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 2:
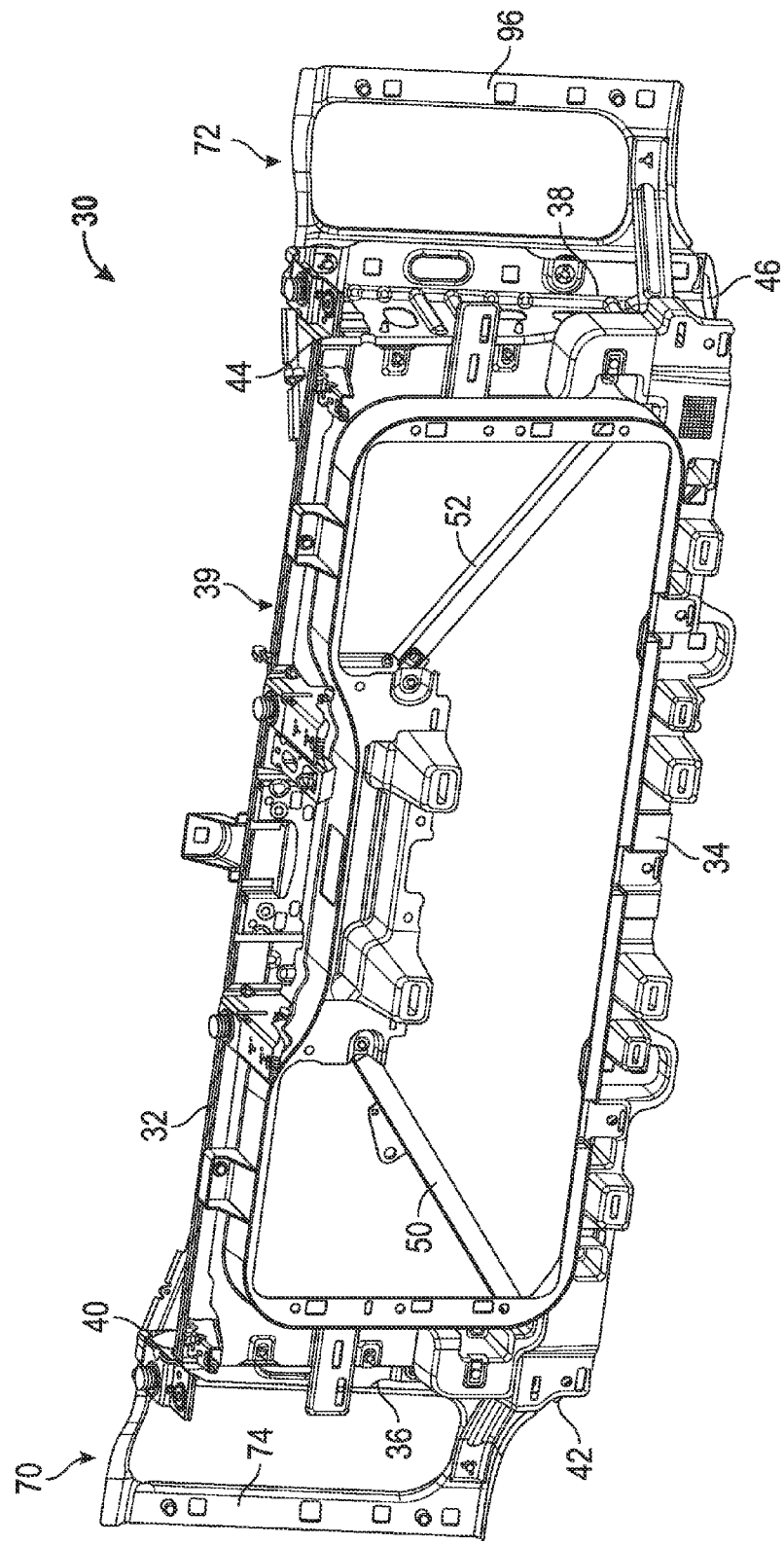
FIG. 2 is a perspective view of a positioning and reinforcement structure of the front end assembly.

Referring now to FIG. 2, in conjunction with FIG. 1, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in a cross-car direction 27 and relatively parallel to each other. The first side member 36 and the second side member 38 extend relatively parallel to each other, but in a relatively vertical direction 28. As may be understood the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement structure 30, such as by casting, laser welding or spot welding process, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Irrespective of the precise attachment, the top support member 32, the bottom support member 34, the first side member 36 and the second side member 38 form a central portion 39 of the positioning and reinforcement structure 30. Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Figure 3:
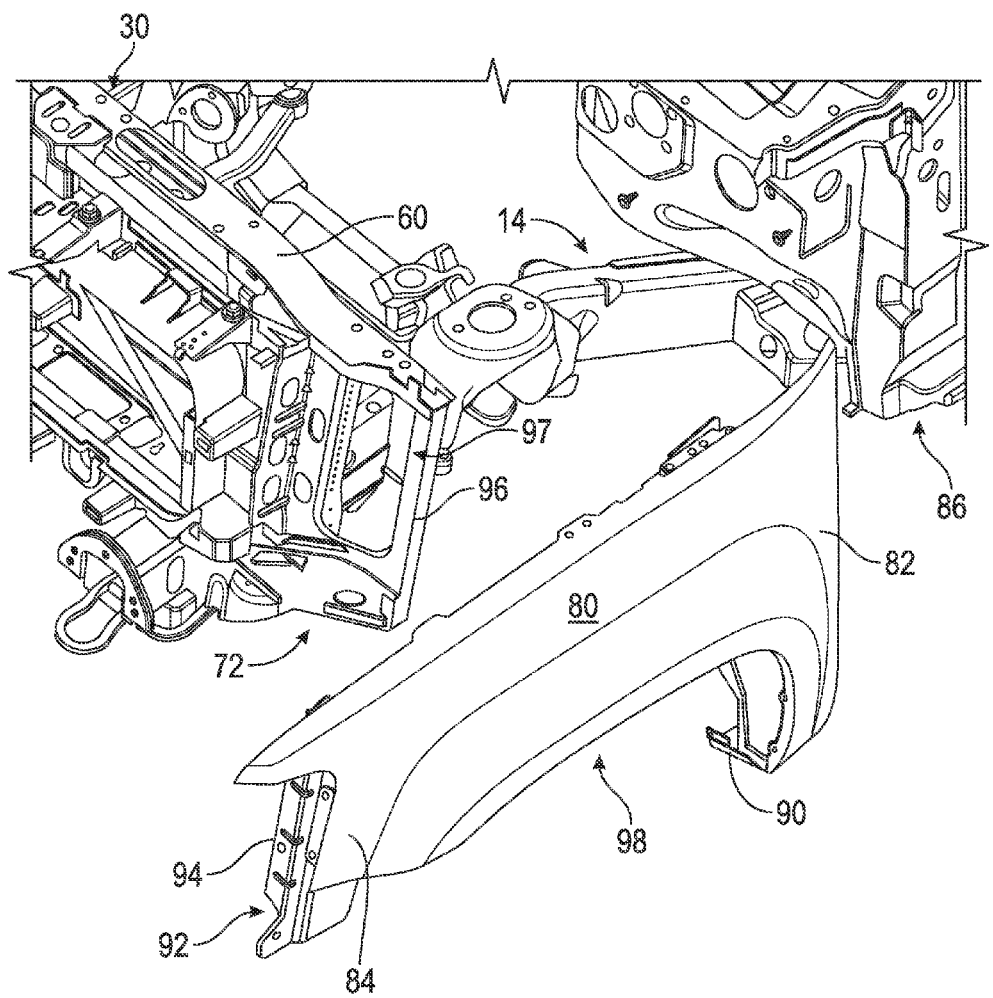
FIG. 3 is a top, front perspective view of the fender assembly.
Figure 4:
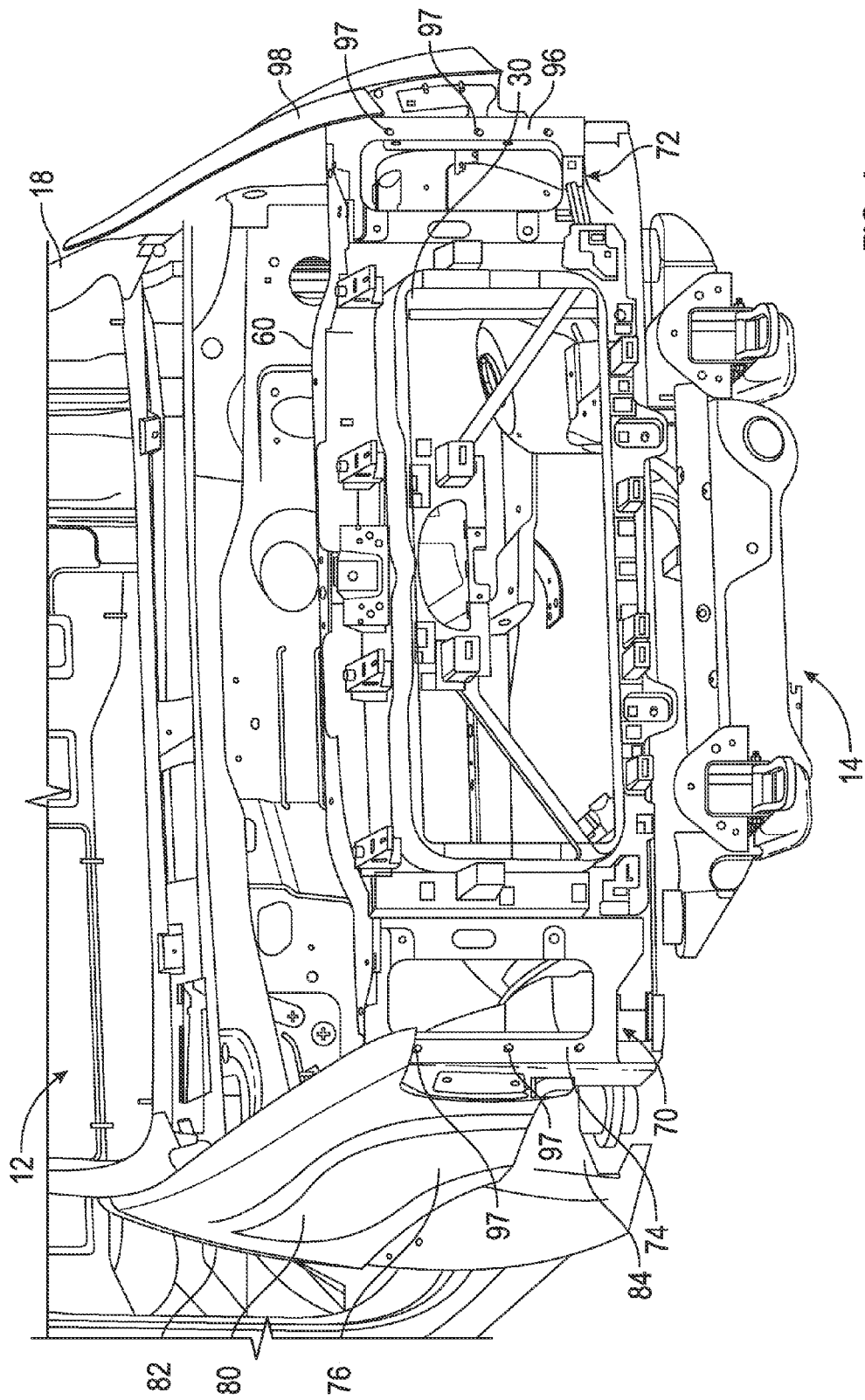
FIG. 4 is a perspective view of the fender assembly operably coupled to a radiator support and the positioning and reinforcement structure.

Referring now to FIGS. 3 and 4, a radiator support 60 is configured to operably couple to an aft portion of the positioning and reinforcement structure 30 via a plurality of mechanical fasteners. It is to be appreciated that although the positioning and reinforcement structure 30 and the radiator support 60 are ultimately disposed in a fixed relationship to each other, a loose fitting relationship between the positioning and reinforcement structure 30 and the radiator support 60 is employed during several assembly phases of the front end assembly 10. Specifically, while the radiator support 60 is fixedly secured to the frame 14, the positioning and reinforcement structure 30 has at least one degree of freedom with respect to displacement relative to the radiator support 60. Such a relationship allows the positioning and reinforcement structure 30 to move during mounting of other components to the positioning and reinforcement structure 30. The tight, fixed relationship between the positioning and reinforcement structure 30 and the radiator support 60 is not established until various other components of the front end assembly 10 are properly located and mounted, as will be described in detail below.

Referring again to FIG. 2, in combination with FIGS. 3 and 4, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. As will be described below, a second fender assembly 98 is also included and comprises identical components as that of the first fender assembly 76, such that common reference numerals are employed. Additionally, reference to the illustrated embodiments may interchangeably denote components of the first fender assembly 76 and the second fender assembly 98 for purposes of discussion. The first fender assembly 76 and the second fender assembly each include a fender 80 having an aft end 82 and a forward end 84, with the aft end 82 being fixable to a region in close proximity to a front edge 86 of a vehicle door opening. A fender mount bracket 90 disposed at the aft end 82 facilitates a structural connection proximate the front edge 86 of the vehicle door opening. Alternatively, a connection may be made between the aft end 82 of the fender 80 and the front edge 86 of the vehicle door opening. The positioning of the first fender assembly 76, and more specifically the fender 80, is the first in a chain of inter-component locating. The aft end 82 is positioned relative to the front edge 86 of the vehicle door to establish a desired gap between the fender 80 and the vehicle door, thereby reducing undesirably small or large gaps. The forward end 84 of the fender 80 includes a fender flange 92 having one or more apertures 94 for receiving one or more pins 97 extending forwardly from the first side flange 74 of the first wing structure 70, thereby establishing a displaceable relationship between the first fender assembly 76 and the positioning and reinforcement structure 30, while setting the positioning and reinforcement structure 30 in the vertical direction 28.

The second wing structure 72 includes a second side flange 96 proximate an outermost location of the second wing structure 72 for fixing the positioning and reinforcement structure 30 to the second fender assembly 98. As noted above, the second fender assembly 98 is a mirror image of the first fender assembly 76 and is disposed at an opposite cross-car location of the vehicle 12, such that detailed description of the second fender assembly 98 is unnecessary, as are associated reference numerals. Similar to the first fender assembly 76, the second fender assembly 98 mounts to a region proximate a front edge 86 of a vehicle door opening and a displaceable relationship between the second fender assembly 98 and the positioning and reinforcement structure 30 is established by disposal of the fender flange 92 over at least one pin 97 of the second side flange 96.

The first fender assembly 76 and the second fender assembly 98 are each attached to the radiator support 60 with one or more mechanical fasteners extending through at least one location proximate the first side flange 74 and the second side flange 96 of the first wing structure 70 and the second wing structure 72, respectively. Fastening of the first fender assembly 76 to the radiator support 60 sets the radiator support in a fore-aft direction 26. The mechanical fasteners may comprise a threaded fastener, such as a shoulder bolt, which draws the radiator support 60 forwardly to an aft surface of the positioning and reinforcement structure 30, thereby establishing a fore-aft plane that the radiator support 60 and the positioning and reinforcement structure 30 are located in. Specifically, the first fender assembly 76 and the second fender assembly 98 determine the fore-aft location of the radiator support 60 and the positioning and reinforcement structure 30 upon engagement of the first fender assembly 76 and the second fender assembly 98 with the positioning and reinforcement structure 30 and the radiator support 60. As described above, the radiator support 60 has a loose fitting relationship with the positioning and reinforcement structure 30 during at least a portion of the assembly, and a slipping relationship between the radiator support 60 and the positioning and reinforcement structure 30 in the cross-car direction 27 and the up-down direction is maintained subsequent to establishing the fore-aft location.

Figure 5:
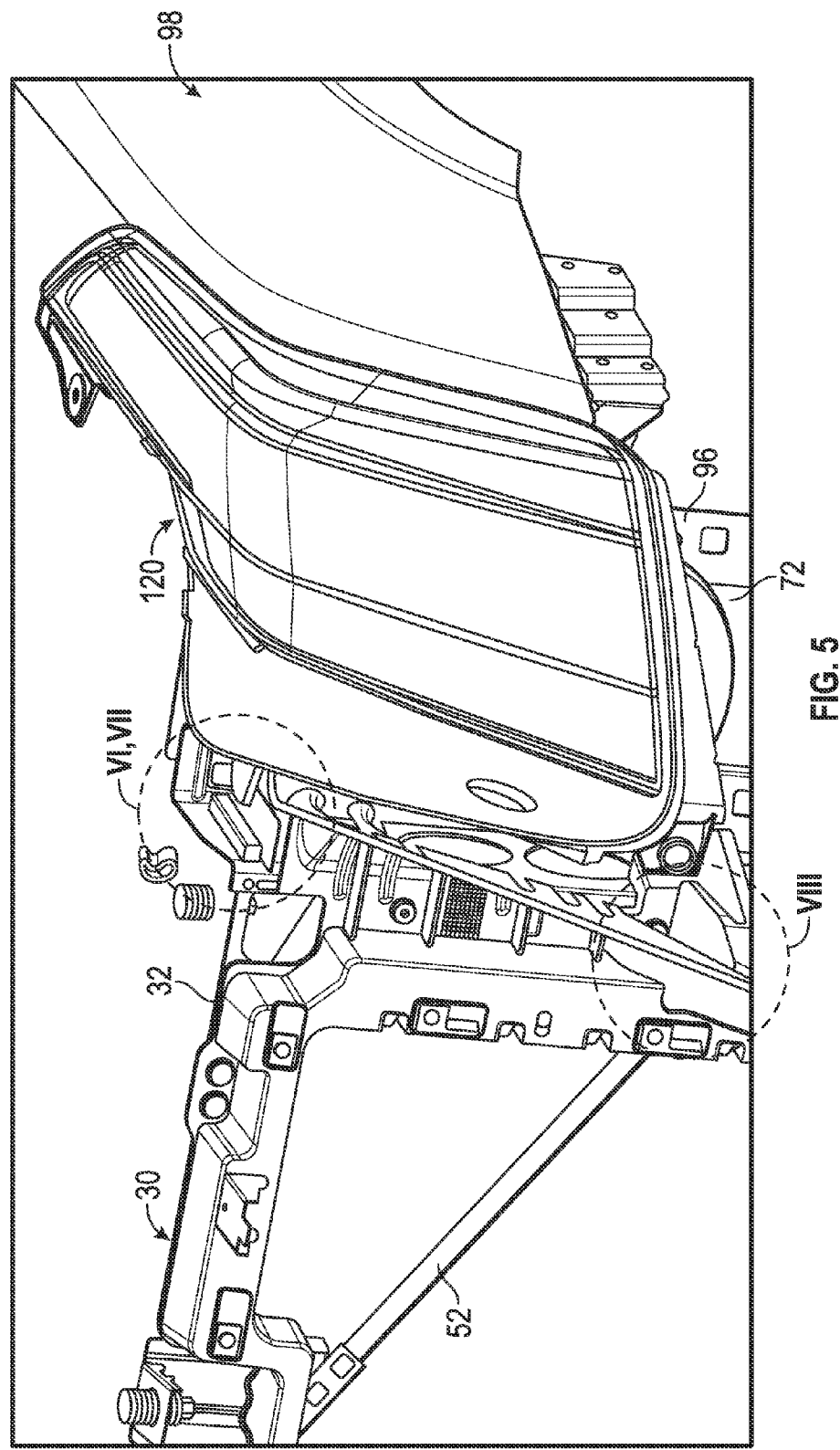
FIG. 5 is a perspective view of a vehicle headlamp assembly.

Referring now to FIG. 5, in addition to the previously described locating and mounting features associated with the positioning and reinforcement structure 30, a plurality of headlamp locating and mounting interfaces are included in association with loading, staging, locating and mounting of a headlamp assembly 120, which is generally illustrated. The plurality of headlamp locating and mounting interfaces may include such features as guiding paths to facilitate insertion of the headlamp assembly 120 in the fore-aft direction 26, as well as apertures and/or mechanical fasteners to securely retain the headlamp assembly 120, which may also be in operable connection with either fender assembly 76, 98.

Figure 6:
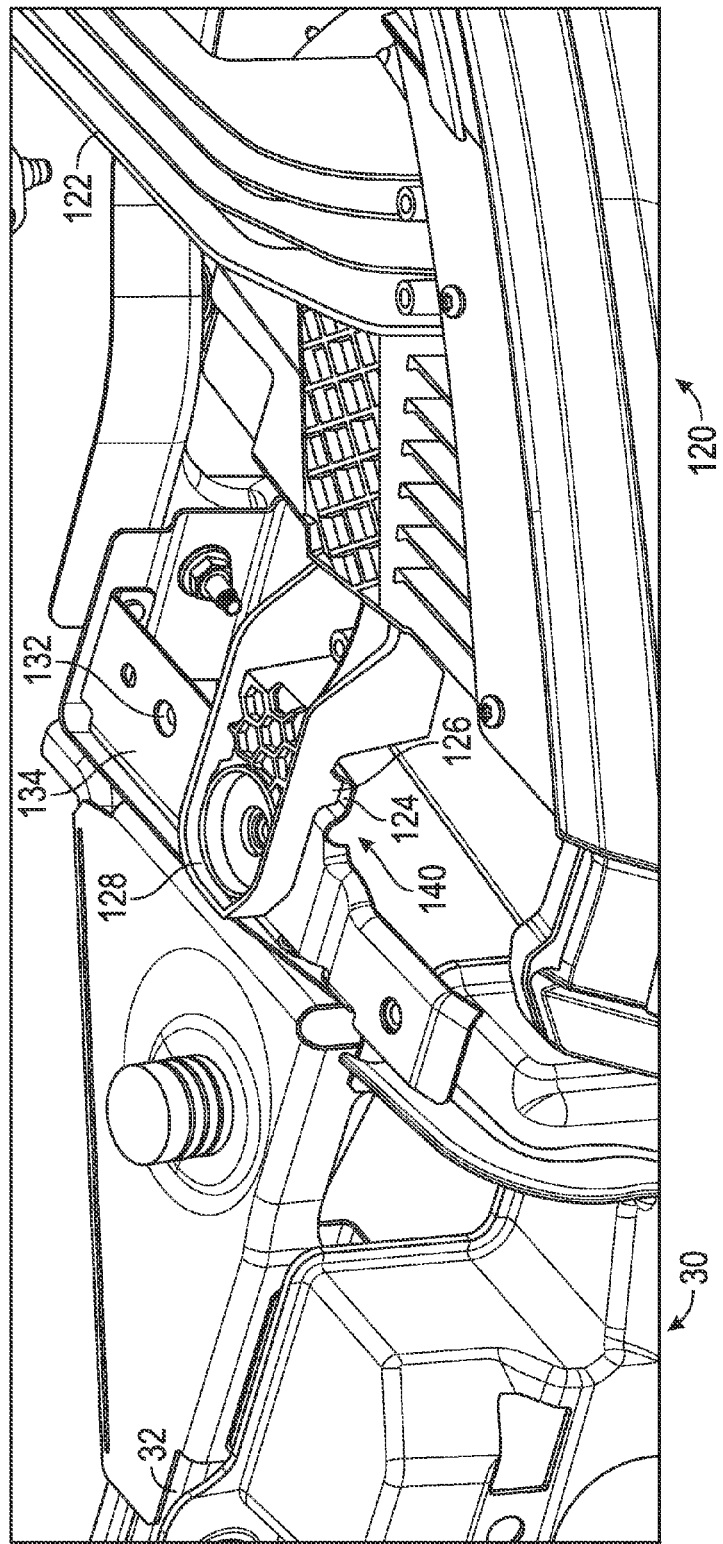
FIG. 6 is an enlarged front perspective view of section VI, VII of FIG. 5 of a headlamp housing of the headlamp assembly in a partially loaded position.
Figure 7:
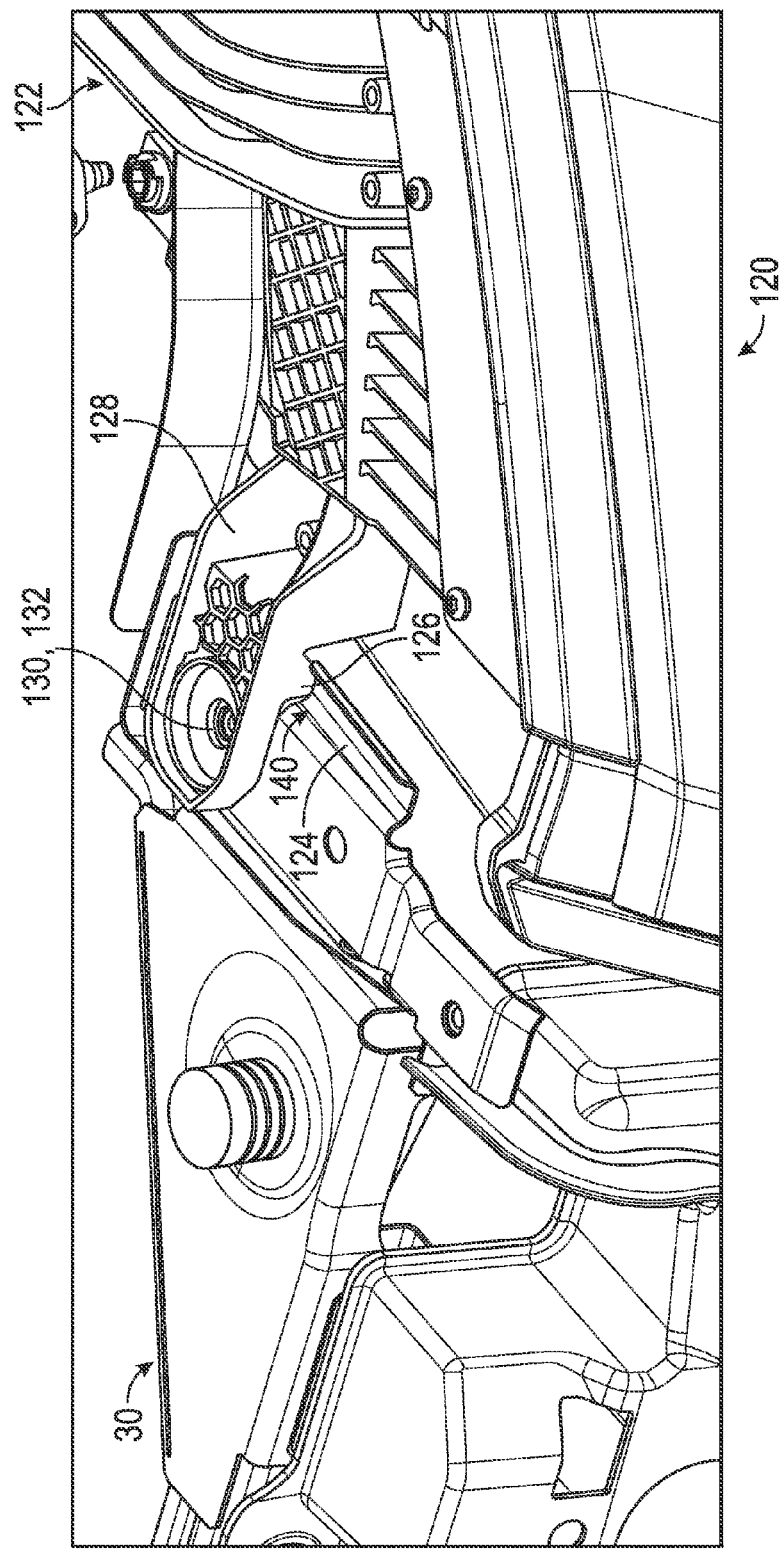
FIG. 7 is an enlarged front perspective view section VI, VII of FIG. 5 of the headlamp housing in a fully loaded position.

Referring to FIGS. 6 and 7, which are enlarged views of section VI and VII of FIG. 5, an upper portion of the headlamp assembly 120 is illustrated in greater detail. The headlamp assembly 120 includes a headlamp housing 122 configured to at least partially enclose and retain a plurality of electrical connectors and illuminating components for providing a light source during desired operating conditions of the vehicle 12. The headlamp housing 122 is typically fitted in close proximity with, and in the illustrated embodiment, between the positioning and reinforcement structure 30 and the first fender assembly 76 or the second fender assembly 98 (FIG. 5). Illustrated is the second fender assembly 98, but it is to be appreciated that the description herein is applicable to installation proximate the first fender assembly 76 as well. Installation of the headlamp housing 122 includes locating the headlamp housing 122 to a loaded position and fastening the headlamp housing 122 to the positioning and reinforcement structure 30, the second fender assembly 98, and/or an alternative vehicle component, such as a fascia or grill, for example.

Irrespective of whether the headlamp housing is fastened to the positioning and reinforcement structure 30, the second fender assembly 98 or an alternative vehicle component, a first guiding component 124 provides a path on which the headlamp housing 122 may be guided. In the illustrated embodiment, the first guiding component 124 comprises a recess that may be characterized as a trough that is configured to engage and guide a second guiding component 126. The first guiding component 124 and the second guiding component 126 may be collectively referred to as a first guiding assembly 140. Although illustrated as a upwardly facing recess or trough, the first guiding component 124 may be a recess configured to receive the second guiding component 126 in a sideways or the cross-car direction 27. As shown, the second guiding component 126 comprises a protrusion extending downwardly from the headlamp housing 122 into engagement with the first guiding component 124. It is contemplated that the second guiding component 126 may be formed at numerous portions of the headlamp housing 122, but in an exemplary embodiment the second guiding component 126 extends from a first housing attachment tab 128 that includes a first aperture 130 corresponding to a second aperture 132 of a mounting component, such as the positioning and reinforcement structure 30, for example. In an alternative embodiment, the first guiding component 124 comprises a protrusion, while the second guiding component 126 comprises a recess.

In operation, the headlamp housing 122 is slid along the first guiding component 124 via the second guiding component 126 to ensure proper location and orientation of the headlamp housing 122. FIGS. 6 and 7 illustrate the transition from a first position of the headlamp housing 122 toward a second position, referred to as a fully loaded position of the headlamp housing 122. The first aperture 130 and the second aperture 132 are substantially aligned at the fully loaded position, such that a mechanical fastener may be inserted to retain the headlamp housing 122 in place. Intermediate positions between the first position and the fully loaded position are employed to provide an installation operator opportunity to install various components within the headlamp housing 122, such as illuminating components and electrical connectors which form an electrical connection from an electrical source to the illuminating components. An upper shelf 134 is configured to at least partially support the first housing attachment tab 128, and thereby the headlamp housing 122. The first guiding component 124 may be formed proximate the upper shelf 134.

Figure 9:
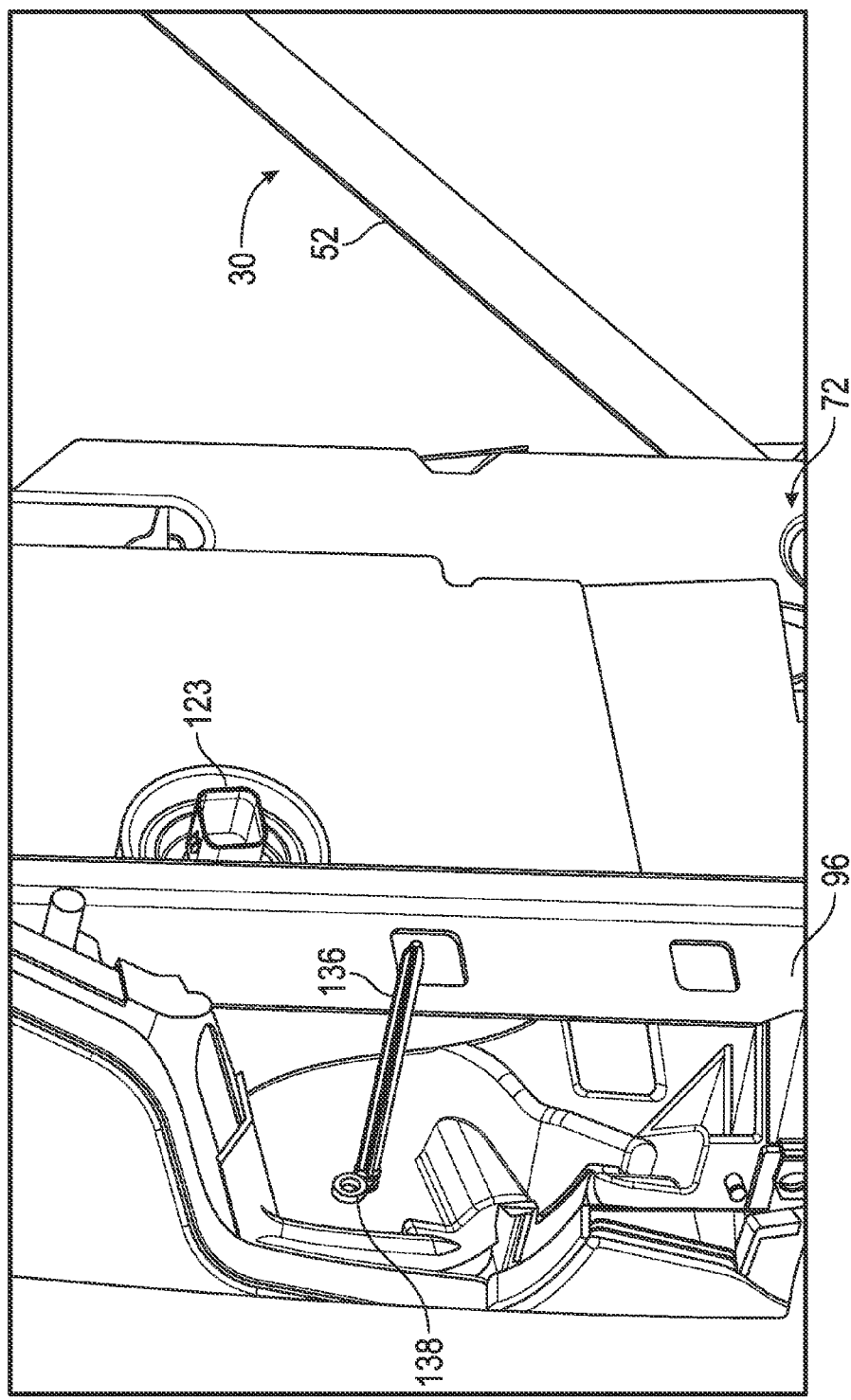
FIG. 9 is a rear perspective view of the headlamp housing.

In an exemplary embodiment, and as best shown in FIG. 7, the first guiding component 124 extends only partially along an entire length of the upper shelf 134, with respect to the fore-aft direction 26 of the vehicle 12. In this way, the first guiding component 124, or trough, terminates or is disposed sufficiently downward in the vertical direction 28 to reduce or eliminate influence on the second guiding component 126, and thereby the headlamp housing 122. This may be achieved by forming the first guiding component 124 at an angle relative to a plane of the upper shelf 134. Specifically, as shown, the first guiding component 124 angles downwardly relative to the upper shelf 134 from the front to the rear. While positioned in an an intermediate position on the upper shelf 134, a locating pin 136 (FIG. 9) extending from the headlamp housing 122 protrudes through an aperture 138 of an adjacent vehicle component to prevent rotational motion of the headlamp housing 122 during installation of components within or proximate to the headlamp housing 122 through a receiving structure 123. The locating pin 136 may be integrally formed with the headlamp housing 122 or may be a removable element.

Figure 8:
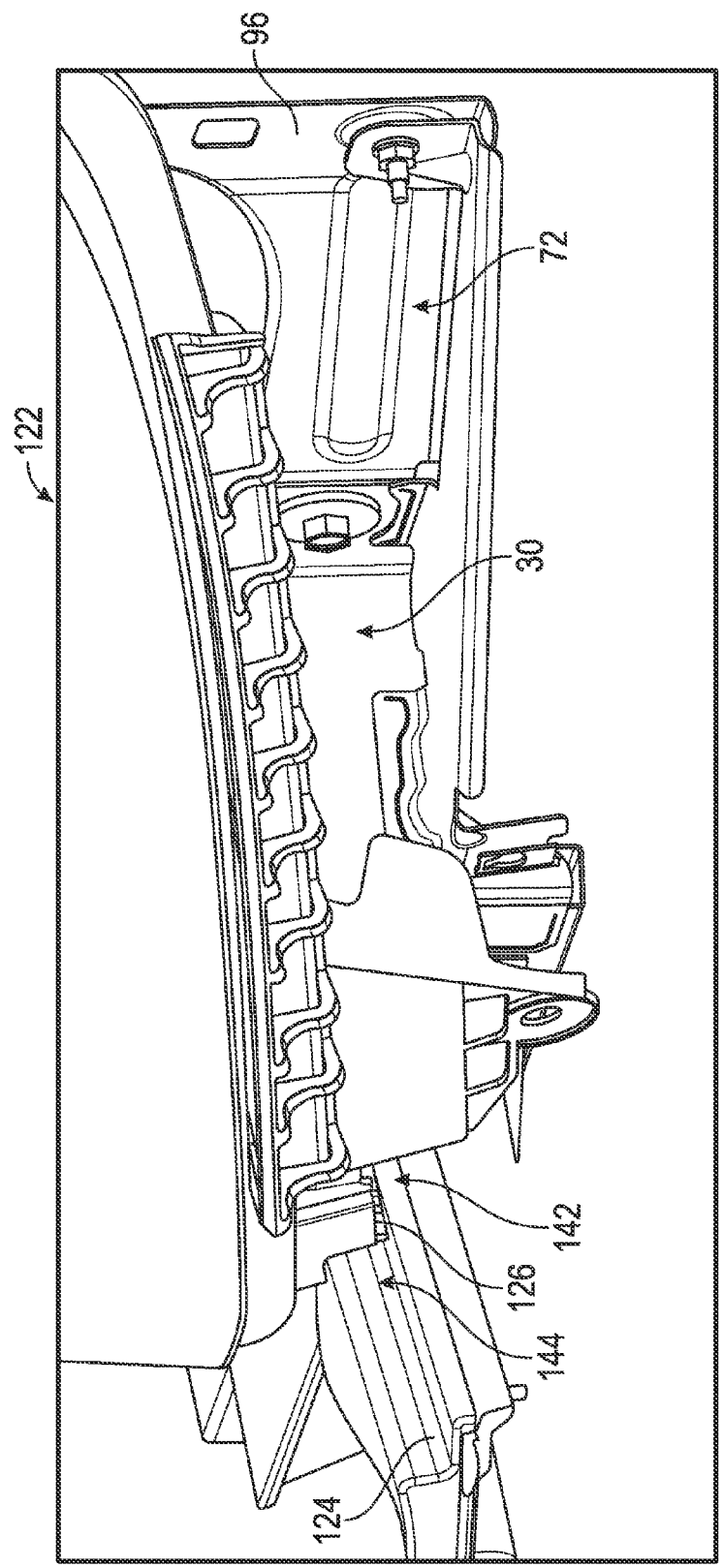
FIG. 8 is an enlarged front perspective view of section VIII of FIG. 5 of the headlamp housing.

Referring to FIG. 8, which is an enlarged view of section VIII of FIG. 5, a second guiding assembly 142 is illustrated and is located proximate a lower region of the headlamp housing 122 in a vertically spaced manner from the first guiding assembly 140. The second guiding assembly 142 may be integrated with a lower shelf 144 that is similar in construction to the upper shelf 134 described in detail above. The second guiding assembly 142 includes similar guiding components as that of the first guiding assembly 140, but it can be appreciated that alignment and dimensions may vary. Regardless of the precise alignment and dimensions, the second guiding assembly 142 provides similar functionality as that of the first guiding assembly 140 and facilitates more accurate and efficient loading of the headlamp housing 122 by increasing stability, for example.

Advantageously, the headlamp housing 122 is guided and loaded in a properly aligned manner with a reduced likelihood of undesirable contact with other front end assembly components. Additionally, staging rests, such as the upper shelf 134 and the lower shelf 144, provide resting positions for the headlamp housing 122 that an installation operator may rely on to allow hands-free positioning of the headlamp housing 122 during necessary installation and connection of various other components.

Figure 10:
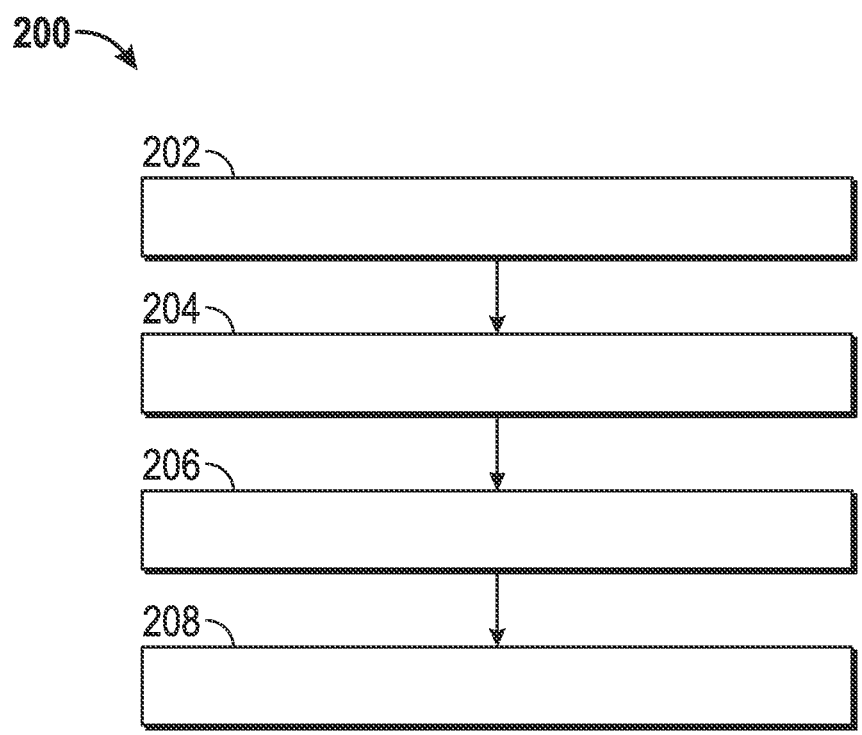
FIG. 10 is a flow diagram illustrating a method of installing the vehicle headlamp assembly.

A method of installing a vehicle headlamp assembly 200 is also provided as illustrated in FIG. 10 and with reference to FIGS. 1-9. The vehicle 12, and more specifically the front end assembly 10 and the headlamp assembly 120 have been previously described and specific structural components need not be described in further detail. The method of installing a vehicle headlamp assembly 200 includes disposing 202 the headlamp housing 122 in close proximity with the positioning and reinforcement structure 30 and the fender assembly 76 or 98. The first guiding component 124 is aligned 204 with the second guiding component 126 of the headlamp housing 122 and the second guiding component 126 is slid 206 along the first guiding component 124 toward a loaded position. The locating pin 136 is extended 208 from the headlamp housing 122 through the aperture 138 of an adjacent vehicle component for securing the headlamp housing 122 in a non-rotatable position.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle headlamp assembly comprising:
    a first guiding component operably coupled to a positioning and reinforcement structure;
    a headlamp housing having a second guiding component for engaging the first guiding component in a sliding relationship for directing of the headlamp housing toward a loaded position; and
    at least one locating pin integrally formed with and extending from the headlamp housing, the at least one locating pin configured to extend through an aperture of an adjacent vehicle component for providing stable positioning of the headlamp housing during installation of the vehicle headlamp assembly.

2. The vehicle headlamp assembly of claim 1, wherein the first guiding component comprises a recess region and the second guiding component comprises a protrusion region, wherein the recess region is configured to guide the protrusion region therein.

3. The vehicle headlamp assembly of claim 1, wherein the first guiding component comprises a protrusion region and the second guiding component comprises a recess region, wherein the protrusion region is configured to guide the recess region thereon.

4. The vehicle headlamp assembly of claim 1, wherein the first guiding component is integrally formed with the positioning and reinforcement structure.

5. The vehicle headlamp assembly of claim 1, wherein the first guiding component is integrally formed with a fender assembly.

6. The vehicle headlamp assembly of claim 1, wherein the first guiding component is integrally formed with a fascia operably coupled to the positioning and reinforcement structure.

7. The vehicle headlamp assembly of claim 1, further comprising a shelf comprising the first guiding component for supporting the headlamp housing during installation of the vehicle headlamp assembly.

8. The vehicle headlamp assembly of claim 1, further comprising a first guiding assembly comprising the first guiding component and the second guiding component.

9. The vehicle headlamp assembly of claim 8, further comprising a second guiding assembly vertically spaced from the first guiding assembly along the headlamp housing.

10. The vehicle headlamp assembly of claim 1, further comprising a first housing attachment tab comprising the second guiding component.

11. The vehicle headlamp assembly of claim 10, wherein the first housing attachment tab is mechanically fastened to the positioning and reinforcement structure.

12. A method of installing a vehicle headlamp assembly comprising:
- disposing a headlamp housing in close proximity with a positioning and reinforcement structure and a fender assembly;
- aligning a first guiding component of at least one of the positioning and reinforcement structure and the fender assembly with a second guiding component of the headlamp housing;
- sliding the second guiding component along the first guiding component toward a loaded position; and
- extending a locating pin extending from the headlamp housing through an aperture of an adjacent vehicle component for securing the headlamp housing in a non-rotatable position.

13. The method of claim 12, further comprising inserting an illuminating component into the headlamp housing prior to positioning of the headlamp housing in the loaded position.

14. The method of claim 13, further comprising electrically connecting a plurality of connectors to the illuminating component.

15. The method of claim 13, further comprising supporting the headlamp housing on a shelf during installation of the illuminating component and a plurality of electrical connectors.

16. The method of claim 12, further comprising mechanically fastening the headlamp housing to at least one of the positioning and reinforcement structure and the fender assembly.

* * * * *